(12) United States Patent
Yonezawa

(10) Patent No.: US 7,355,940 B2
(45) Date of Patent: Apr. 8, 2008

(54) OPTICAL DISK APPARATUS AND WAITING METHOD THEREOF

(75) Inventor: Minoru Yonezawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 10/603,989

(22) Filed: Jun. 26, 2003

(65) Prior Publication Data

US 2004/0001410 A1 Jan. 1, 2004

(30) Foreign Application Priority Data

Jun. 28, 2002 (JP) ............................. 2002-190892

(51) Int. Cl.
*G11B 7/00* (2006.01)
(52) U.S. Cl. .................. 369/47.42; 369/53.24
(58) Field of Classification Search ............ 369/44.26, 369/44.27, 44.33, 53.22, 53.24, 53.28, 53.37, 369/94
See application file for complete search history.

(56) References Cited

U.S. PATENT DOCUMENTS

| | | | | |
|---|---|---|---|---|
| 5,414,451 A | * | 5/1995 | Sugiyama et al. | 347/258 |
| 5,420,838 A | * | 5/1995 | Maeda et al. | 369/44.33 |
| 5,442,608 A | * | 8/1995 | Umeda et al. | 369/44.27 |
| 5,881,032 A | * | 3/1999 | Ito et al. | 369/94 |
| 5,995,458 A | * | 11/1999 | Itoi | 369/53.22 |
| 6,456,584 B1 | * | 9/2002 | Nagata et al. | 369/275.2 |
| 6,552,985 B1 | * | 4/2003 | Wierenga | 369/53.22 |
| 6,996,046 B2 | * | 2/2006 | Ono et al. | 369/53.37 |
| 2002/0044507 A1 | * | 4/2002 | Hagiwara et al. | 369/47.4 |
| 2002/0110068 A1 | * | 8/2002 | Araki et al. | 369/53.24 |
| 2002/0114244 A1 | * | 8/2002 | Kelly et al. | 369/53.37 |

FOREIGN PATENT DOCUMENTS

| | | |
|---|---|---|
| JP | 4-87032 | 3/1992 |
| JP | 10-079126 | 3/1998 |
| JP | 10172147 A * | 6/1998 |

* cited by examiner

*Primary Examiner*—William Korzuch
*Assistant Examiner*—Nathan Danielsen
(74) *Attorney, Agent, or Firm*—Pillsbury Winthrop Shaw Pittman, LLP

(57) ABSTRACT

An optical disk apparatus including a waiting position determining circuit which detects physical properties of each region in an optical disk after recording or reproducing processing is finished and decides a waiting position of an optical head according to the detection, and various kinds of control mechanisms which controls a position of the optical head according to the decided waiting position in order to move the optical head, is provided. By making the optical head wait at a position before two or more tracks in an unrecorded region, the recording processing can be resumed stably and surely and the recording processing can be preferentially performed in the remaining unrecorded region.

4 Claims, 14 Drawing Sheets

Recording signal : during recording
Constant signal : during reproducing } → 28 Laser

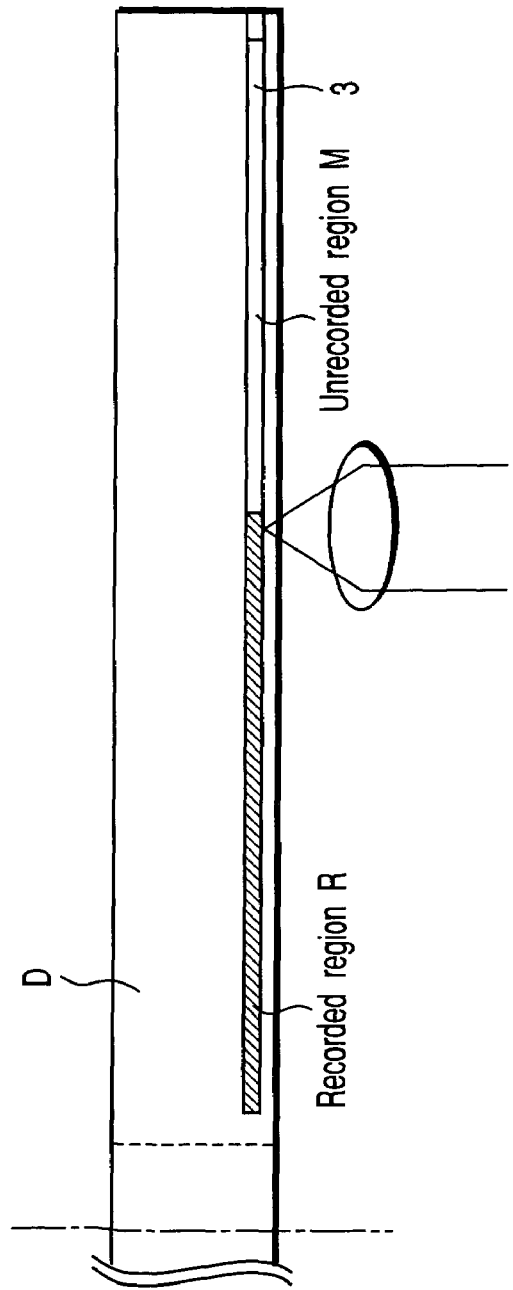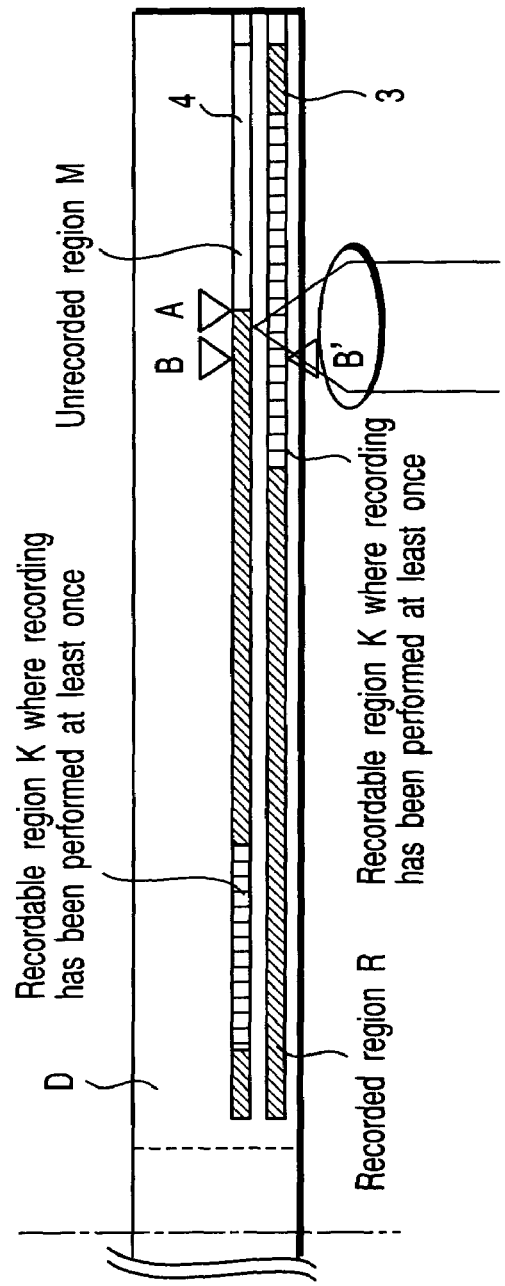

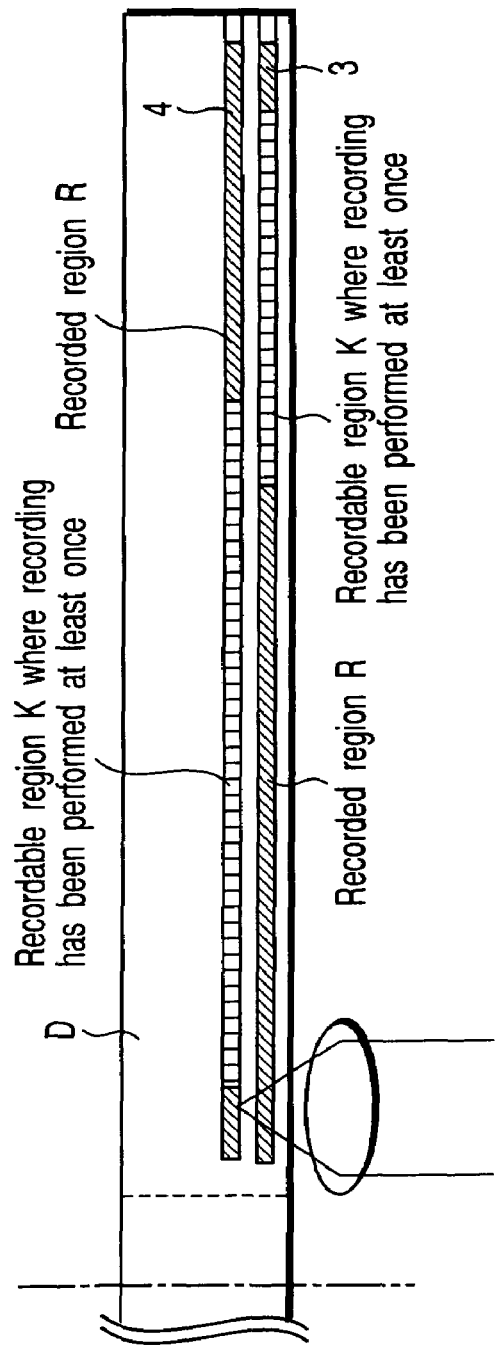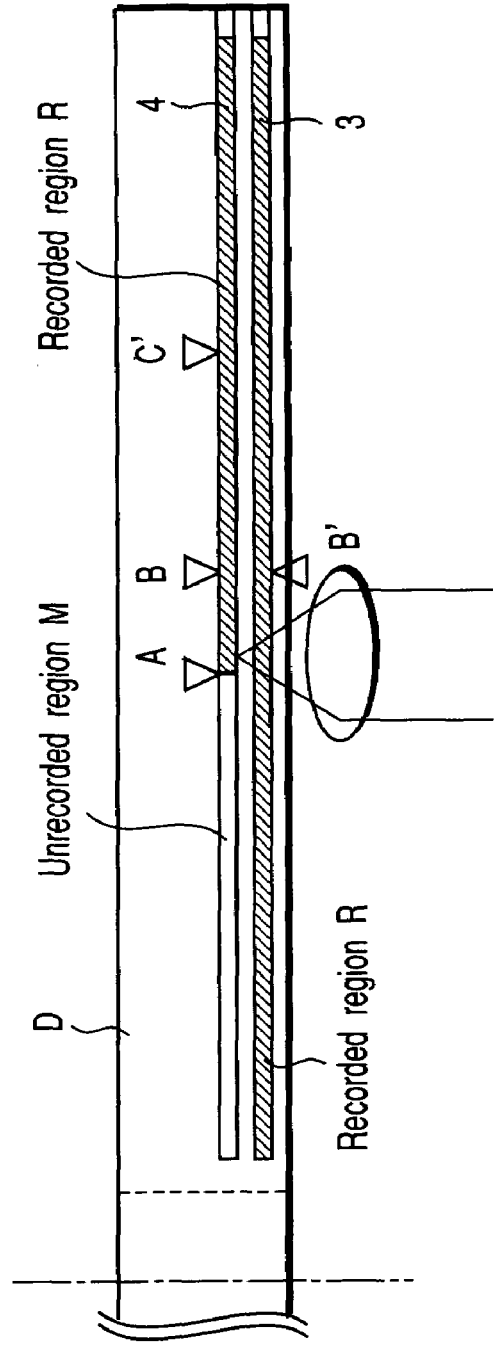

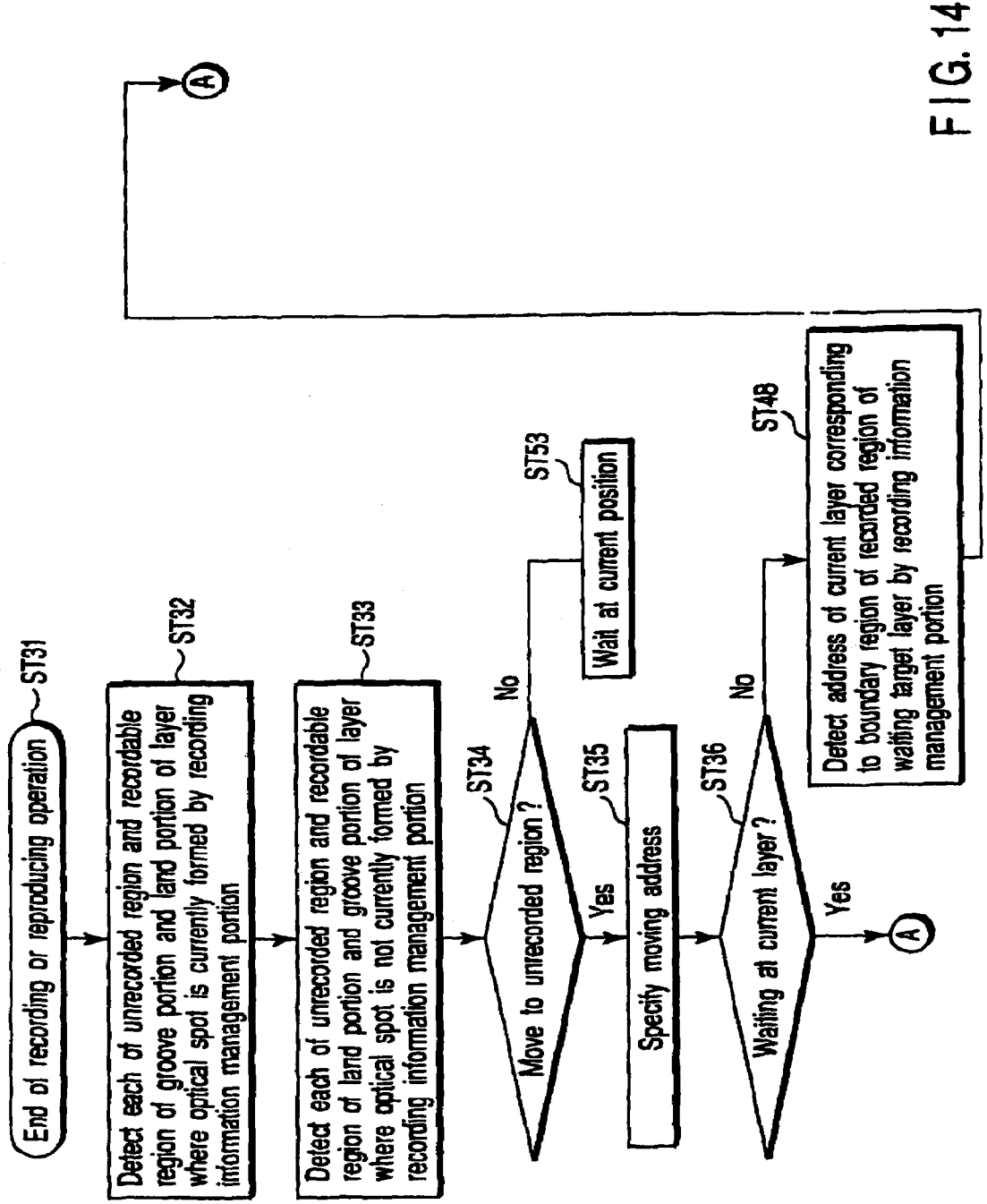
F I G. 14

OPTICAL DISK APPARATUS AND WAITING METHOD THEREOF

CROSS-REFERENCE TO RELATED APPLICATIONS

This application is based upon and claims the benefit of priority from the prior Japanese Patent Application No. 2002-190892, filed Jun. 28, 2002, the entire contents of which are incorporated herein by reference.

BACKGROUND OF THE INVENTION

1. Field of the Invention

The present invention relates to an optical disk apparatus causing an optical head to wait before an unrecorded region after recording and reproducing processing of an optical disk, and a waiting method thereof.

2. Description of the Related Art

Recently, an optical disk apparatus such as DVD (Digital Versatile Disc) has been developed and comes widespread. Further added value such as operating reliability and usability is required for the optical disk drive. For example, in an optical disk apparatus described in Jpn. Pat. Appln. KOKAI Publication No. 10-79126, the optical disk apparatus decides whether an optical disk is OTP or PTP in reproducing the optical disk in which plural information recording layers exist on one side, the optical disk apparatus waits by one-track jump to an inner or outer radius of the optical disk when the optical disk apparatus received temporally stop command.

The above-described optical disk apparatus disclosed in the publication performs the limited processing to a reproduce-only optical disk, and can hold a relatively stable servo state by the one-track jump.

However, in a recordable type of optical disk, because a recorded region differs from an unrecorded region in reflectivity of a recording layer, holding a servo state at a boundary between the recorded region and the unrecorded region is to perform the servo at a region where a servo signal level fluctuates, so that it is an extremely unstable state. When the recording is started from the boundary region, in order to properly generate necessary information such as error correction code, it is necessary to return to the truck before two tracks at the maximum to reproduce the information and then the recording is performed.

That is, the above-described conventional optical disk apparatus is reproduce-only, and can not solve specific problems of the optical disk recording apparatus. This is because the unrecorded region and the recorded region in the information recording layer are different in the reflectivity depending on characteristics of the optical disk. With reference to the characteristics of the optical disk, there are two kinds of characteristics, i.e., low-to-high characteristics in which the reflectivity is increased by the data recording and high-to-low characteristics in which the reflectivity is decreased by the recording. This change in the reflectivity is generally double or triple or more, various kinds of signals are affected by the change in the reflectivity in the boundary region between the recorded region and the unrecorded region.

As a result, it is difficult to perform the precise servo in the boundary region between the recorded region and the unrecorded region, like the conventional optical disk apparatus, possibility arises that the optical disk apparatus is positioned at both regions of the recorded region and the unrecorded region in a track holding state of the waiting, when the optical disk apparatus waits at the position before one track from a reproducing end region. Accordingly, particularly in the case of the recording processing, there is the problem that the servo operation can not be stably maintained during the waiting for the next command.

Further, in order to perform the recording and reproducing the information, rapid response time from generation of recording and reproducing request to start of the recording and reproducing processing is required in the case of the recording type of optical disk. However, there is the problem in the conventional apparatus that the recording processing can not be immediately performed even if the apparatus receives a record command, because the optical head does not always wait in the unrecorded region.

In the case of the recording processing, sometimes generation is performed after reading the error correction code embedded in the previously recorded data. In order to smoothly realize this operation, it is an optimum method in which the optical head waits at a position where the error correction code to be read is recorded. There is the problem that the rapidly reading of the error correction code is not necessarily performed only by the return of one track like the conventional method.

BRIEF SUMMARY OF THE INVENTION

According to an aspect of the present invention, there is provided an optical disk apparatus comprising: an optical head which irradiates an optical disk having an information recording layer with a laser beam or receives reflected wave, and performs recording processing or reproducing processing; a waiting position decision portion which detects physical properties of each region in the optical disk after the recording processing or reproducing processing is finished, and decides a waiting position of the optical head according to the physical properties; and a control portion which controls a position of the optical head according to the waiting position decided by the waiting position decision portion in order to move the optical head to wait.

BRIEF DESCRIPTION OF THE SEVERAL VIEWS OF THE DRAWING

FIG. 5 shows an example of a waiting position of the optical head in the optical disk apparatus according to the first embodiment of the invention;

FIG. 6 shows another example of the waiting position of the optical head in the optical disk apparatus according to the first embodiment of the invention;

FIG. 9 shows another example showing the waiting position of the optical head in the optical disk apparatus according to the first embodiment of the invention;

FIG. 12 shows an example of a waiting position of an optical head in an optical disk apparatus according to a second embodiment of the invention;

FIG. 14 is a flow chart for explaining an example of a waiting method according to the third embodiment of the invention;

DETAILED DESCRIPTION OF THE INVENTION

An optical disk apparatus and a waiting method thereof according to an embodiment of the invention will be described in detail below, referring to the accompanying drawings.

OPTICAL DISK APPARATUS ACCORDING TO AN EMBODIMENT OF THE INVENTION

Figure 1:
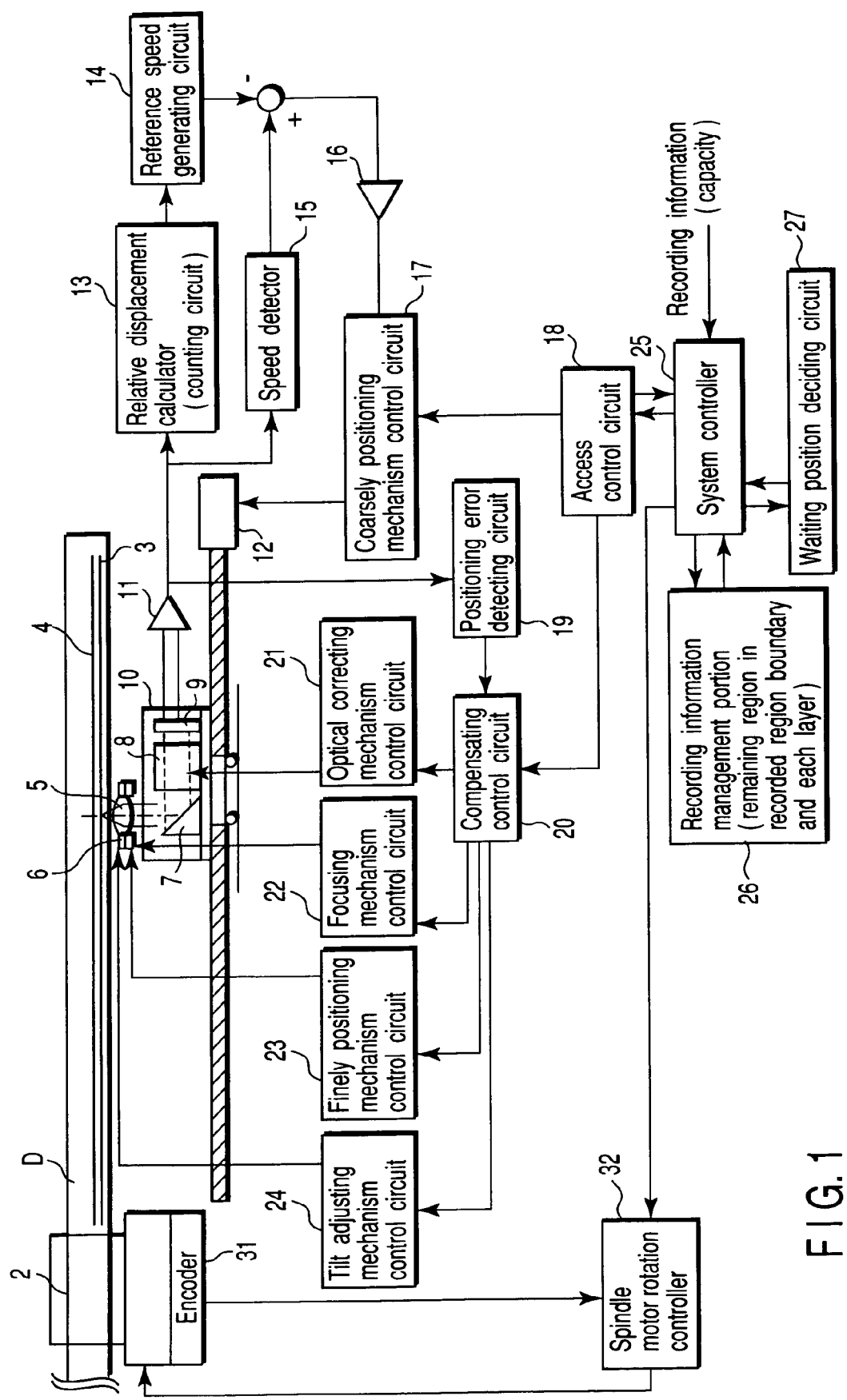
FIG. 1 is a block diagram showing an example of an optical disk apparatus according to a first embodiment of the invention.
Figure 2:
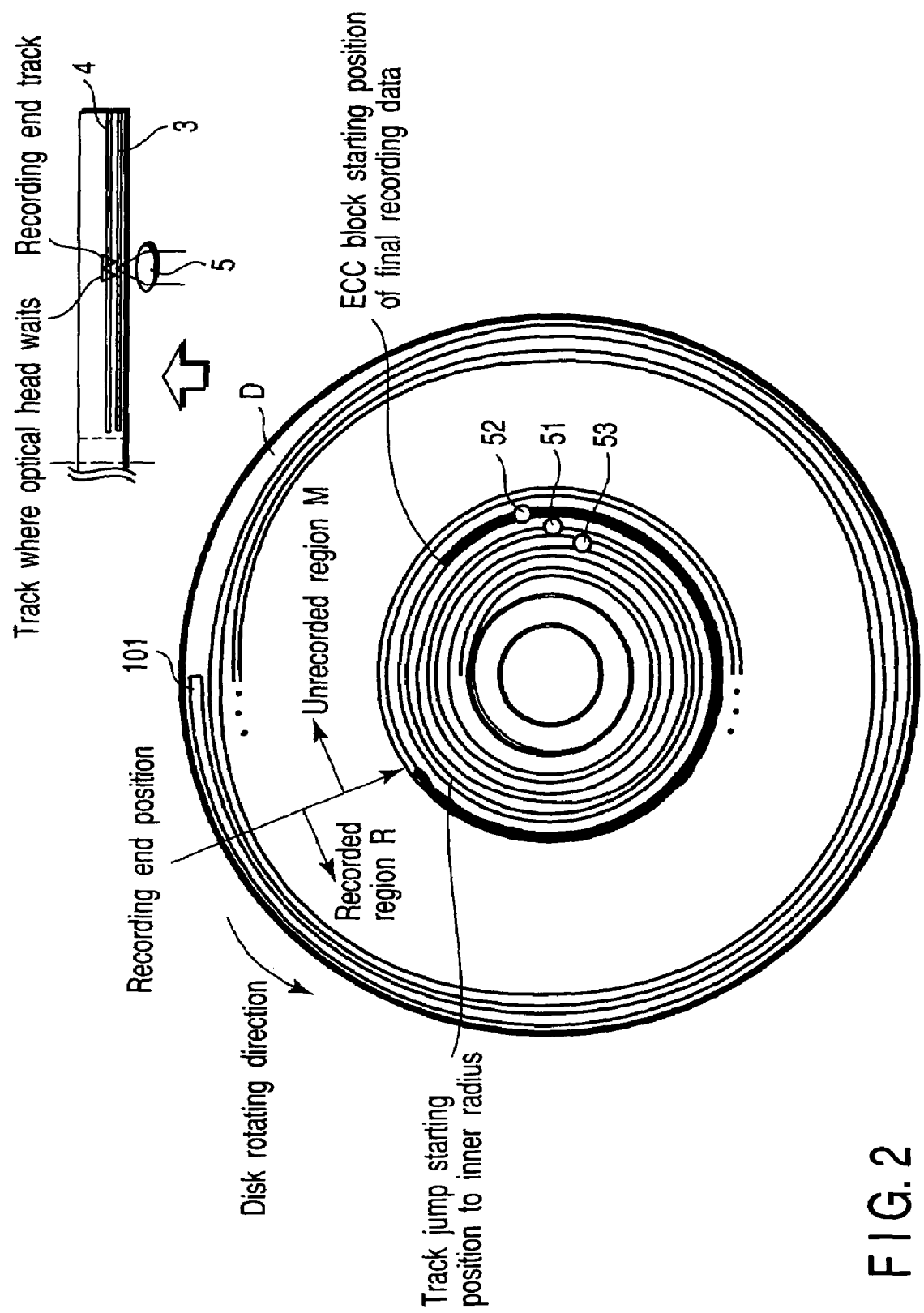
FIG. 2 is a block diagram showing an example of an optical disk according to the first embodiment of the invention.
Figure 3:
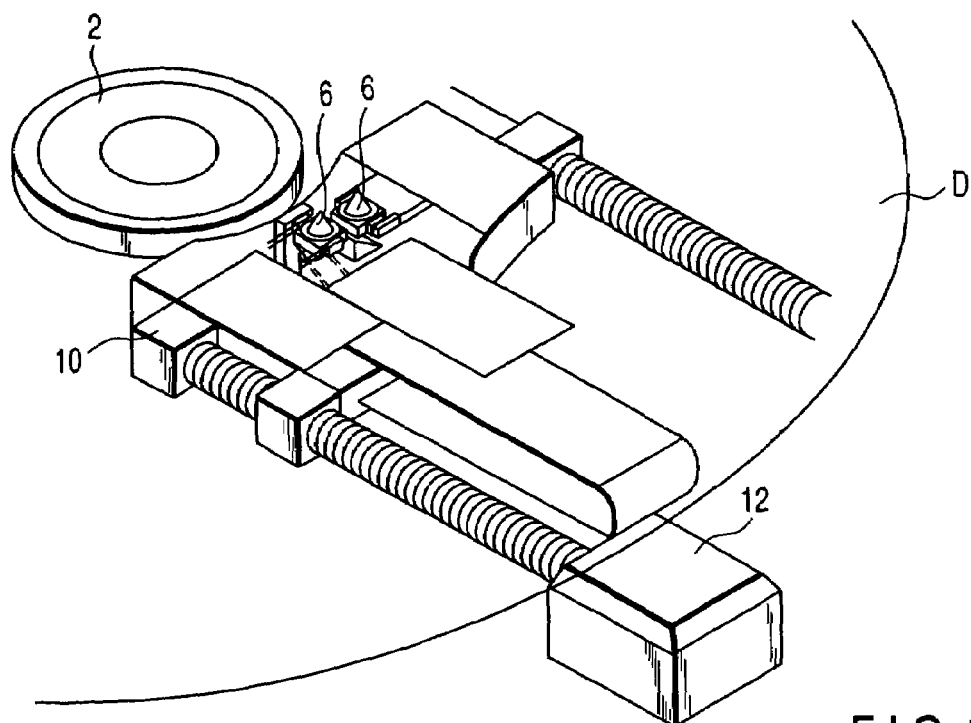
FIG. 3 is a view showing a configuration of an arrangement of an optical head and the like in the optical disk apparatus according to the first embodiment of the invention.
Figure 4:
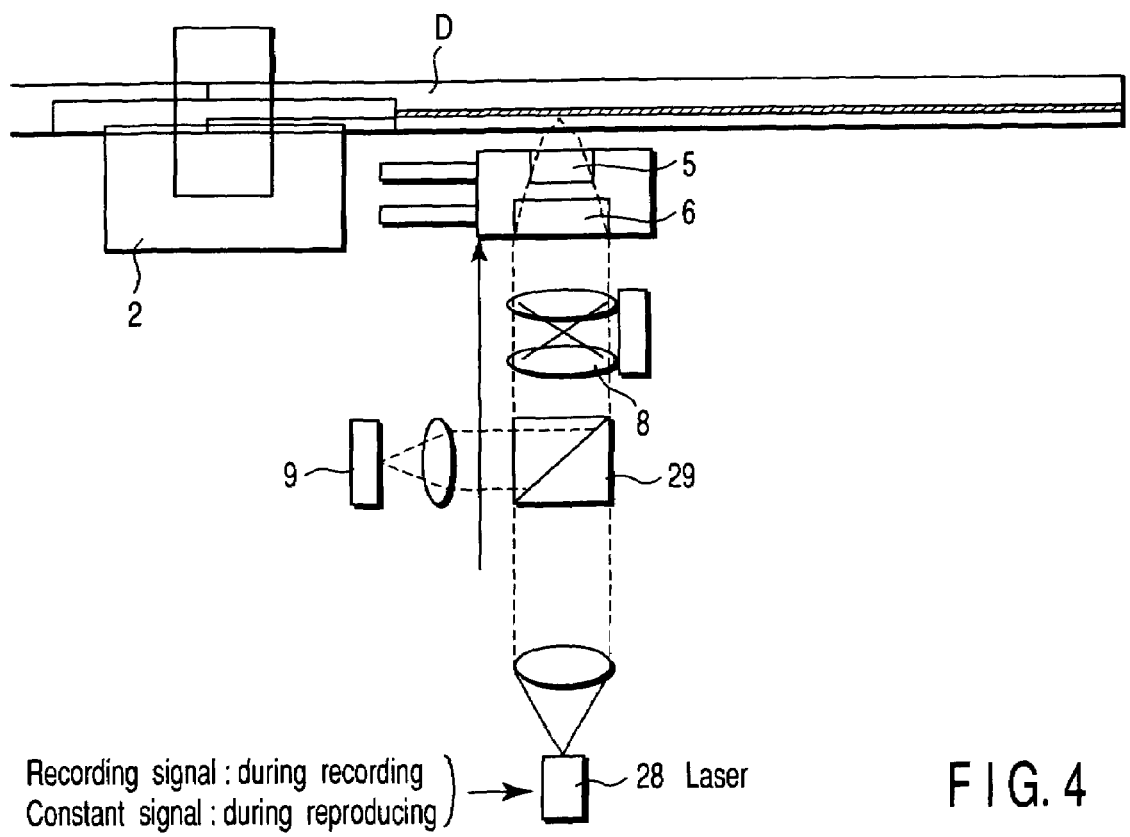
FIG. 4 is a diagram showing a configuration of the optical head in the optical disk apparatus according to the first embodiment of the invention.

A configuration of an optical disk apparatus according to a first embodiment of the invention will be described. FIG. 1 is a block diagram showing an example of the optical disk apparatus according to the first embodiment of the invention, FIG. 2 is a block diagram showing an example of an optical disk according to the first embodiment of the invention, FIG. 3 is a view showing a configuration of an arrangement of an optical head and the like in the optical disk apparatus, and FIG. 4 is a diagram showing a configuration of the optical head in the optical disk apparatus. There will be described the optical disk apparatus performing the recording processing to the optical disk in which, as shown in FIG. 2, two information recording layers are provided on an one side and an information track of each information recording layer has a single-spiral-shaped groove structure 101 continuously recordable from an inner radius to an outer radius.

As shown in FIG. 2, an optical disk D which is an object of the processing by the optical disk apparatus according to the first embodiment of the invention is a rewritable type of medium having a phase change recording layer as the information recording layer, and is the recording medium having a first recording layer 3 and a second recording layer 4, in which the recording and reproducing of the information are performed by a light beam condensed by an objective lens 5 provided in the optical disk apparatus according to the first embodiment of the invention. Rotation of the optical disk D is controlled by a spindle motor rotating control circuit 29, which detects the number of revolution by output of an encoder 28 installed in a spindle motor 2 provided in the optical disk apparatus or a reproducing signal from the optical disk D and makes the number of revolution at the desired number. Particular when information is recorded, a ZCLV (Zoned Constant Linear Velocity) method maintaining constant linear speed of the rotation or the like is adopted. In the zone to which the track where the recording is performed belongs, the rotation is controlled so as to be at the constant number of revolution.

An optical head 10 perform the recording (forming a mark) by irradiating a predetermined information recording layer of the optical disk with a laser beam having a predetermined wavelength. The recording is performed by, for example, a mark length recording method in which an edge of the recording mark has the information. The laser beam emitted from a laser light source provided in the optical head 10 is collimated to parallel light and incident to an optically correcting mechanism 8 through an optical element (not shown). In the optically correcting mechanism 8, aberration is corrected with a relay lens or a liquid crystal element such that an optical spot formed in, e.g., the information recording layer does not have spherical aberration. The light beam corrected by the aberration correcting mechanism 8 is incident to the objective lens 5 through an upwardly reflecting mirror 7, and forms an optical spot on a predetermined information recording surface of the optical disk D. On the other hand, part of the light beam reflected on the information recording surface is incident to a photodetector 9 through the upwardly reflecting mirror 7 again. The photodetector 9 detects a position error to a target position of the optical spot condensed on the information recording surface. There are the position errors such as a focusing position error for forming the optical spot focused on the information recording surface, a tracking position error, a slope error, and a spherical aberration error.

The information track for performing the recording and reproducing of the information is formed on the information recording surface, deviation of the position in a radial direction of the optical disk to a target track is the tracking position error. The slope error is a deviation angle between an optical axis of the light beam emitted by the objective lens 5 and a normal of the optical disk D. When the deviation angle is larger, comatic aberration occurs in the optical spot and quality of the optical spot is degraded. The spherical aberration is one which degrades the quality of the optical spot like the slope error, and spherical aberration is caused in such a manner that a wavefront condensed by the objective lens 5 shifts from a spherical surface.

In the optical disk apparatus, a positioning error detecting circuit 19 detects the above-described position errors by using the photodetector 10 and a difference circuit 11, a compensation control circuit 20 calculates an amount of control operation corresponding to each of the position errors such that the proper optical spot is formed. The amount of control operation is inputted to an optically correcting mechanism control circuit 21, a focusing mechanism control circuit 22, a finely positioning mechanism control circuit 23, a coarsely positioning mechanism control circuit 17, and a slope adjusting mechanism control circuit 24, respectively. Each control circuit drive-controls the optically correcting mechanism 8, an objective lens positioning mechanism 6, and a coarsely positioning mechanism 12 on the basis of the inputted amount of control operation such that the optical spot is properly formed at the target position. Output from the difference circuit 11 is given to a relative displacement calculator 13 and a speed detector 15, calculated outputs of a reference speed generating circuit 14 and the speed detector 15 are supplied to the coarsely positioning mechanism control circuit 17 through an amplifier 16, and the output of the coarsely positioning mechanism control circuit 17 drive-controls the coarsely positioning mechanism 12.

In addition to the above-described configuration of the driving system of the optical head 10, the optical disk apparatus includes configurations of a recording processing system, a reproducing processing system, and a control system which are not shown. That is, the optical disk apparatus has a data reproducing circuit which is a circuit for the reproducing processing system connected to the optical head 10, a laser control circuit which is a circuit for the recording processing system and controls emission of a semiconductor laser diode built in the optical head 10, a CPU configuring the control portion which controls those operations, RAM and ROM which are storage regions, an interface circuit which performs data communication with an external device, and the like.

Further, FIG. 3 shows an example of a configuration of the optical disk apparatus according to the first embodiment of the invention, and FIG. 4 shows a detail configuration of an optical system of the optical head 10 in the optical disk apparatus of the invention. In these figures, the laser beam emitted from a laser light source 28 is optically adjusted with the optically correcting mechanism using the relay lens 8. A half-prism 29 is utilized in order to transmit the return light from the optical disk D to an error signal detecting system.

First Embodiment

Figure 10:
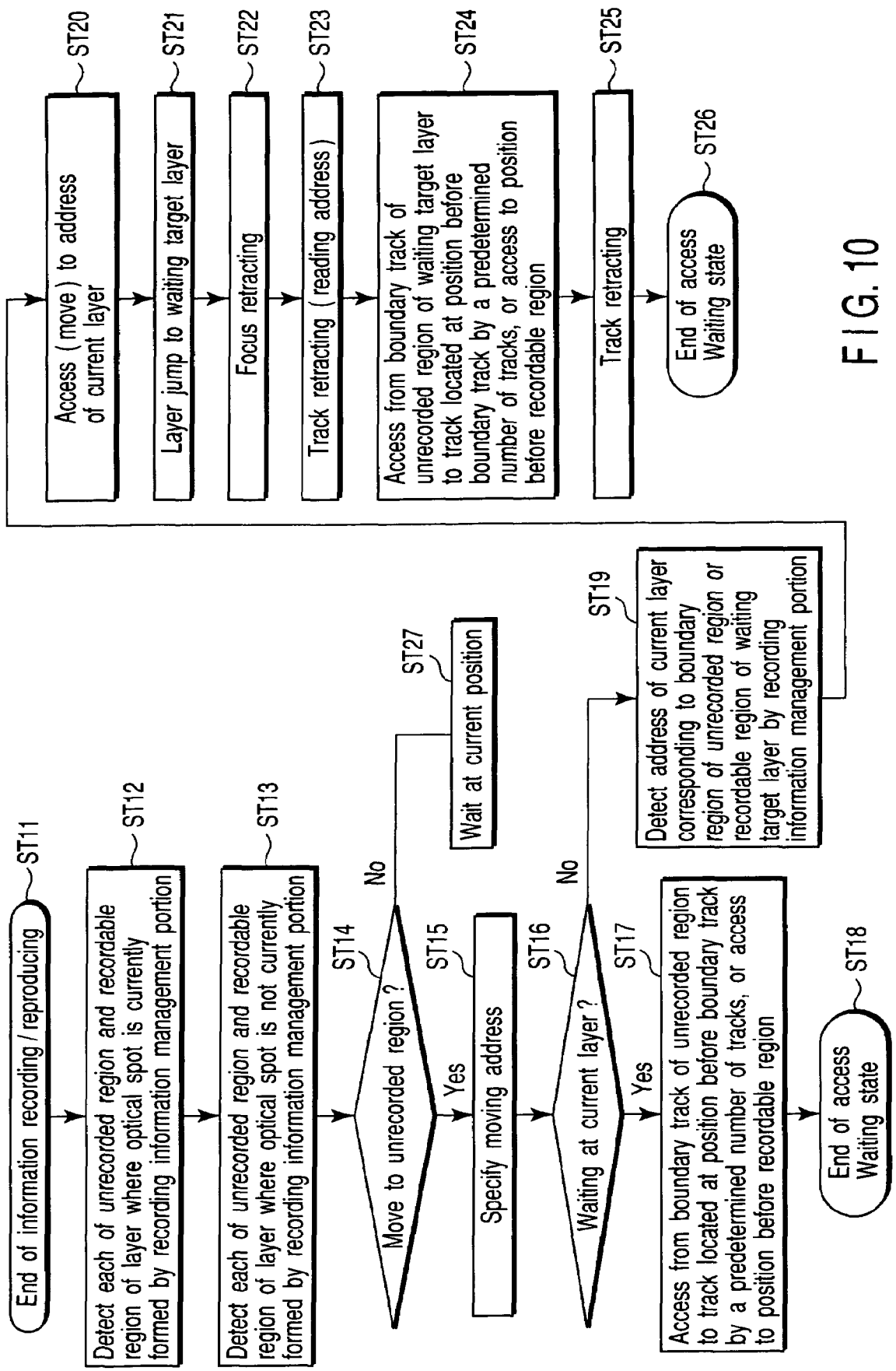
FIG. 10 is a flow chart for explaining an example of a waiting method according to the first embodiment of the invention.
Figure 11:
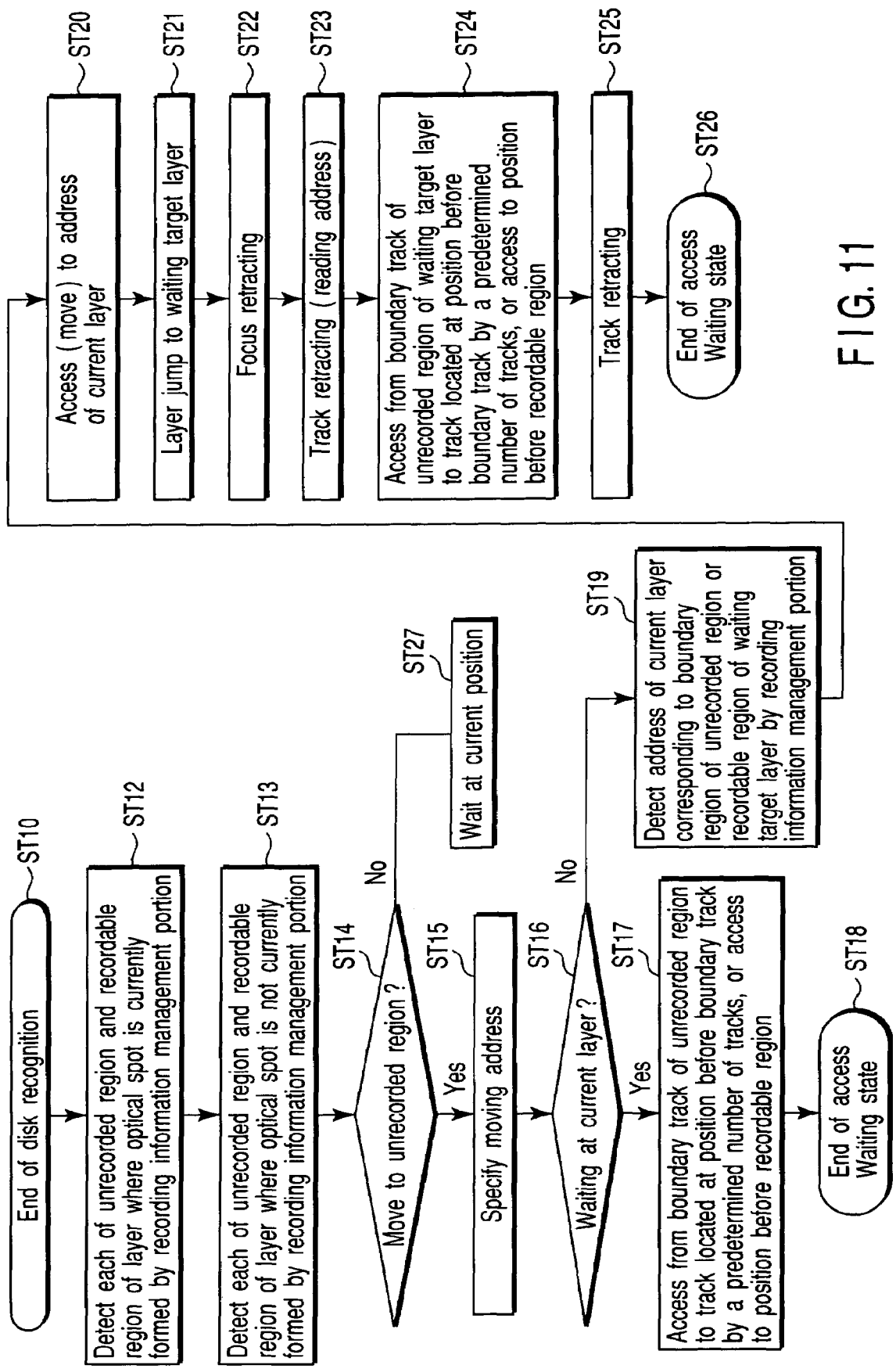
FIG. 11 is a flow chart for explaining waiting processing of the optical head including a layer jump of the optical disk apparatus according to the first embodiment of the invention.
Figure 17:
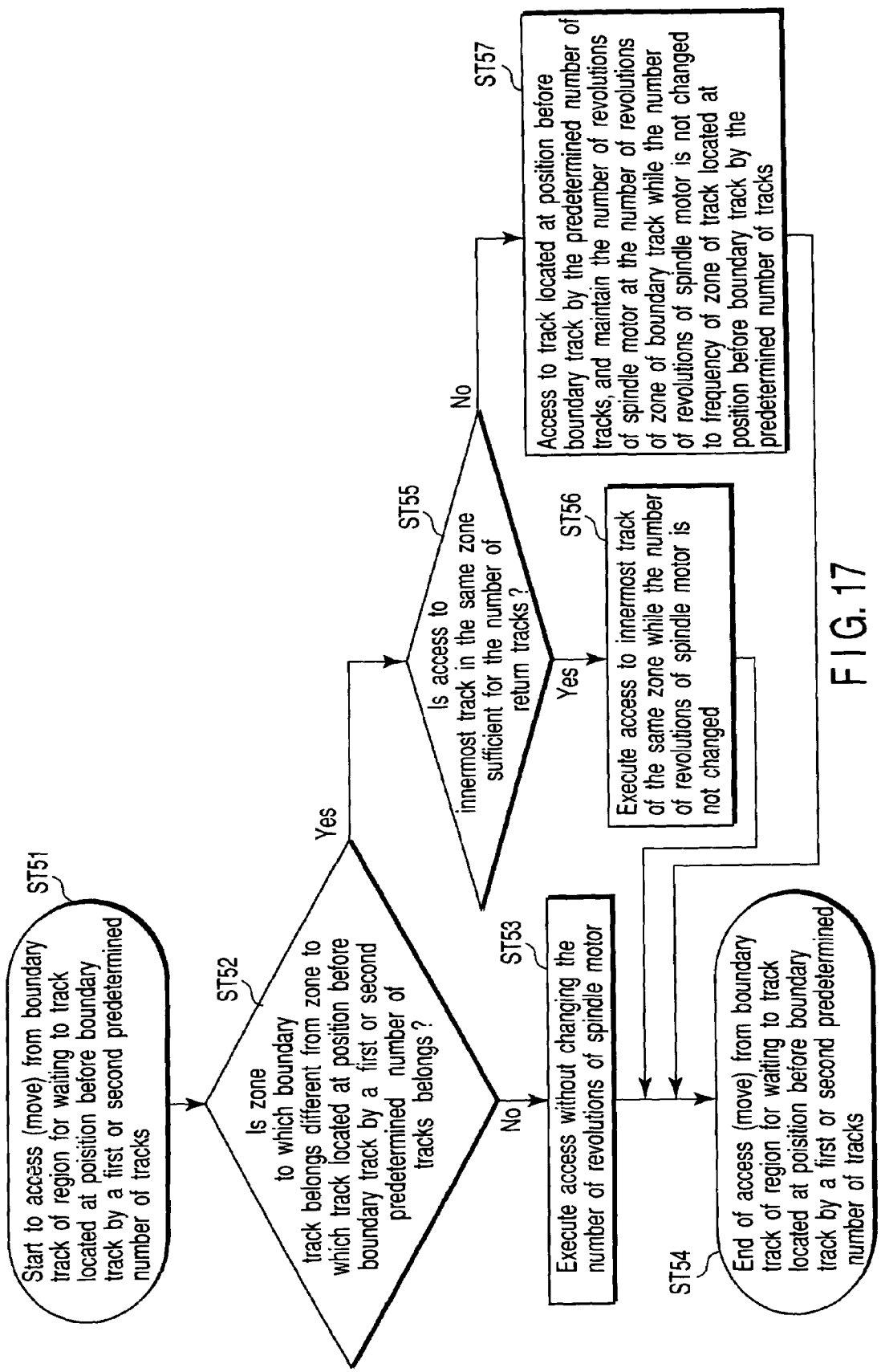
FIG. 17 is a flow chart for explaining waiting processing of the optical head including a layer jump of the optical disk apparatus according to the first embodiment of the invention.

In the optical disk apparatus for the optical disk having one or more recording layers, the first embodiment is to provide the optical disk apparatus causing an optical head to wait at a position before an unrecorded region by a predetermined amount after the recording or reproducing processing is completed. FIGS. 5 to 9 are views showing each example of a waiting position of the optical head in the optical disk, and FIGS. 10, 11 and 17 are flow charts for explaining waiting processing of the optical head including a layer jump of the optical disk apparatus, and the waiting method thereof.

(Principle of the Waiting Method of the Optical Head of the Invention)

The reflectivity of a recorded region R is largely different from that of an unrecorded region M and the servo becomes easily unstable in the optical head waits near the boundary between the recorded region R and the unrecorded region M in the recordable optical disk having the information recording layer. Therefore, the invention enables the rapid recording processing while the operating stability is secured in such a manner that the optical head waits on the recorded region R side at a distance of, e.g., two tracks or more.

Specifically, in the medium having the low-to-high characteristics, the reflectivity of the unrecorded region is not more than 10%, and the reflectivity of the recorded region is not lower than 20%. In this case, when the servo is performed in which the optical spot is formed near the boundary between the recorded region and the unrecorded region, a component of a reflected wave reflected by the lower reflectivity of the unrecorded region is mixed into a component reflected by the higher reflectivity of the recorded region, which affects the shift in a neutral position, at which the servo is performed, to the unrecorded region side. Thus, when the neutral position shifts to the unrecorded region side, the servo becomes a state of positive feedback in which the unrecorded region further strongly affects the servo due to the shift, and the servo becomes very unstable. In order to avoid the unstable state of the servo which remarkably appears in the low-to-high medium, the processing for avoiding the mixture of the component of the reflected wave in the unrecorded region is performed by waiting the optical head at a distance of, e.g., two tracks or more. A push-pull method or a DPD method may be used as the detecting method for obtaining servo information, though the detecting method is described later somewhat, the description is omitted here because basically it is a usual method.

As shown in FIG. 6, the optical disk for recording can be classified at least into the recorded region R where the recording has been performed and the newly recording can not be performed, the unrecorded region M where the recording has not been performed and the newly recording can be performed, and a recordable region K where the recording has been once performed but erasing has performed and the recording can not be performed again. In the waiting method according to the invention, when the unrecorded region M does not exist but the recordable region K exists, the optical head waits before the recordable region K.

Figure 7:
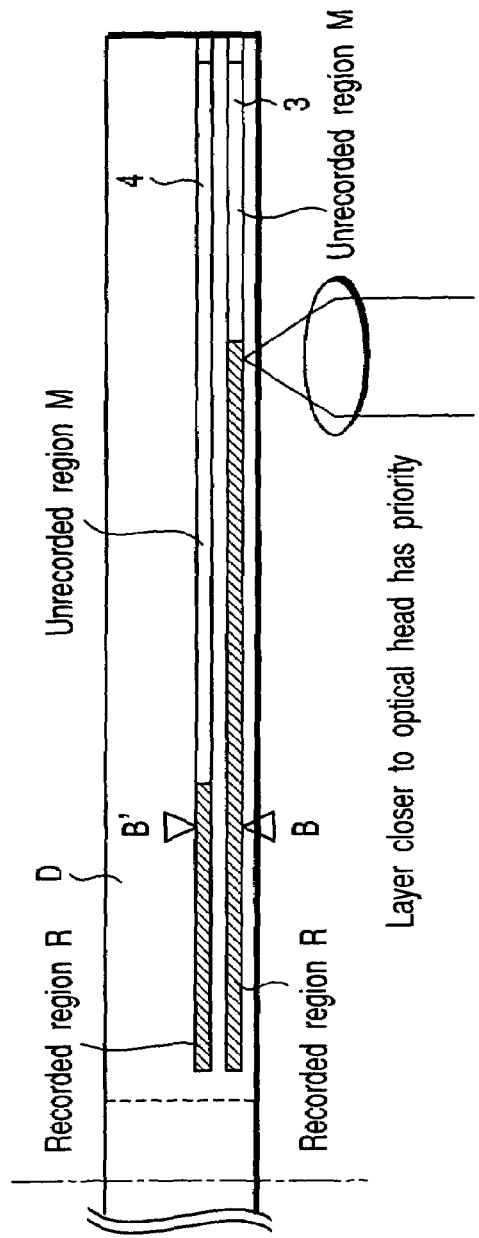
FIG. 7 shows another example of the waiting position of the optical head in the optical disk apparatus according to the first embodiment of the invention.
Figure 8:
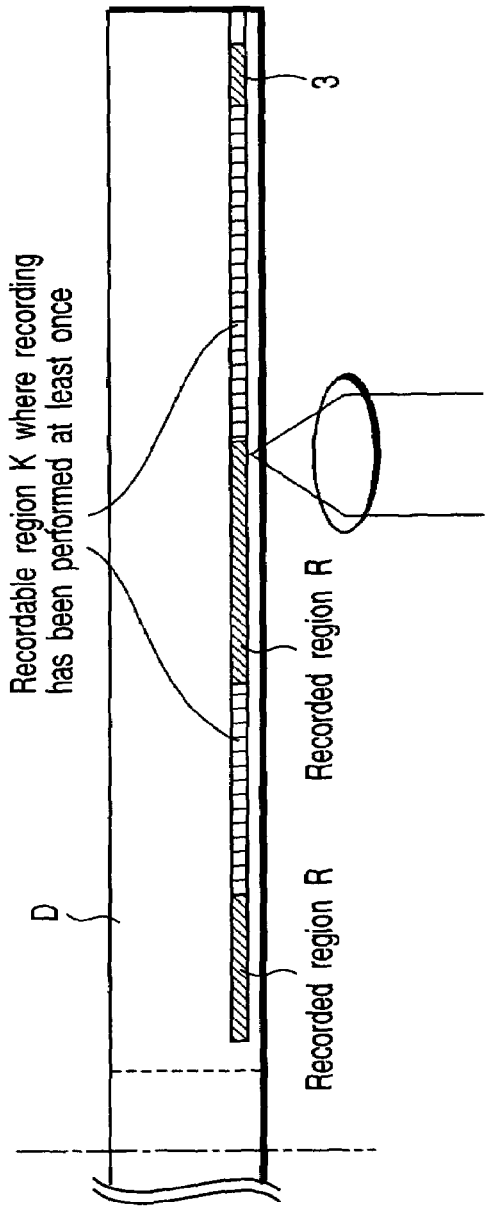
FIG. 8 shows another example of the waiting position of the optical head in the optical disk apparatus according to the first embodiment of the invention.

However, there is a case where the plural unrecorded regions M exist as shown in FIG. 7 or a case in which the plural recordable regions K exist as shown in FIGS. 8 and 9. In such cases, priority is shown below in deciding the waiting position.

(Priority of Waiting Position)

Though the priority of the waiting position is shown below by using the drawing, the priority is not limited but can be freely selected. However, the specific priority is previously decided according to a working condition, and the waiting position is decided by the waiting position determining circuit 27 in FIG. 1.

FIG. 5 shows an example of the basic optical disk D for recording, the waiting position is decided at a position, e.g., before two tracks in one unrecorded region M. The basically waiting position is shown in this case.

FIG. 6 is an example of the optical disk D for recording having plural recording layers, the waiting position is decided at a position, e.g., before two tracks in the unrecorded region M on the second recorded region 4. When the unrecorded region M does not exist in the recording layer 3 in which the recording is finished and the unrecorded region M exists in other layers, the layer jump is performed and the waiting position is decided at a position before the unrecorded region M.

FIG. 7 shows an example of the optical disk D for recording having plural recording layers. Although the unrecorded region M exists in each layer, the waiting position is decided at a position, e.g., before two tracks in the unrecorded region M of the first recorded region 3 on the side of the optical head 10. The unrecorded region M in the layer on the side of the optical head 10 has the priority in principle. It is also possible that the unrecorded region M in the opposite layer on the side of the optical head 10 has the priority.

FIG. 8 shows an example of the optical disk D for recording having one recording layer. The unrecorded region M does not exist and the plural recordable region K exists. In this case, the waiting position is decided at a position before the recordable region K on the right, which has larger storage capacity. Although the recordable region K having the larger storage capacity is selected in principle, there may be also the priority which is decided according to the position of the recordable region K.

FIG. 9 shows an example of the optical disk D for recording having plural recording layers. The unrecorded region M does not exist and the recordable region K exists in each layer. In this case, the waiting position is decided at a position before the recordable region K of the second recording layer 4, which has larger storage capacity. Although the recordable region K having the larger storage capacity is selected in principle, there may be also the priority in which the recordable region K in the layer on the side of the optical head is decided according to the position of the recordable region K.

As described above, making the unrecorded region M the priority than the recordable region K, giving the priority to the unrecorded region M of the layer on the side of the optical disk and giving the priority to the unrecorded region M closer to the recording starting position when the plural unrecorded regions M exist, or giving the priority to the recordable region K having larger storage capacity when only the plural recordable regions K exist can be set as the priority.

(Processing Flow Chart)

A specific example of the waiting method according to the invention, which is performed according to the above-described priority, will be described referring to the flow chart.

As described above, the optical spot is formed on the target position to perform a series of information recording. When the recording or reproducing operation is finished, the optical head enters the waiting operation and waits until a new series of information recording or reproducing command comes to the system controller 25. A sequence of the waiting processing will be described by using the flow chart in FIGS. 10 and 11.

At first, the waiting method of the first embodiment after the information recording or reproducing is described referring to FIG. 10. If the system controller 25 determines that the information recording or the reproducing operation is finished after the information is recorded or reproduced (ST11), a recording information management portion 26 calculates the capacity of the recordable region K and unrecorded region M in the information recording layer in which the optical spots are currently formed (ST12). At the same time, the recording information management portion 26 also calculates the capacity of the recordable region and unrecorded region in the information recording layer in which the optical spots are not currently formed (ST13).

(Distinguishing Method between the Unrecorded Region and the Recordable Region)

At this point, the following patterns are considered for the distinguishing method between the unrecorded region M and the recordable region K. Where patterns 2a and 2b perceive a pattern 3 from a macroscopic viewpoint.

Pattern 1
Unrecorded region: Region where crystalline or amorphous state is uniform
Recorded region: Region where crystalline and amorphous states are mixed Pattern 2a
Unrecorded region: Region where reflectivity is low (for example, not more than 10%)
Recorded region: Region where reflectivity is high (for example, not lower than 20%)

Pattern 2b
Unrecorded region: Region where reflectivity is high
Recorded region: Region where reflectivity is low Pattern 3
Unrecorded region: Region where reflectivity is uniform
Recorded region: Region where regions having different reflectivities are mixed and distributed, and average reflectivity is higher or lower than the above-described region having uniform reflectivity Pattern 4
Unrecorded region: Region where dye is uniformly distributed and reflectivity is uniform
Recorded region: Region where part of dye film is changed and regions having different reflectivities are mixed and distributed, Pattern 5
Unrecorded region: Region where reflection plane of optical spot is flat and uniform
Recorded region: Region where the above-described flat portion is deformed to have concavity and convexity.

The above-described patterns are considered for the distinction between the unrecorded region and the recordable region. The recording information management portion 26 can distinguish between the unrecorded region M and the recordable region K by comparing a height of the reflectivity and a distribution level of the reflectivity with predetermined threshold values according to the detection results of the optical head 10.

On the basis of these results, the waiting position deciding circuit 27 determines whether or not the optical head can be moved to the unrecorded region M according to the priority (ST14). That is, the waiting position deciding circuit 27 determines whether or not the unrecorded region M to which the optical head is moved exists in the recording layer, and the waiting position deciding circuit 27 determines whether or not the recordable region K exists, when the unrecorded region M does not exist. At this point, when both the unrecorded region M and the recordable region K do not exist, the optical head waits at the current position (ST27).

If the movable unrecorded region M or the recordable region K exists, an address to which the optical head is moved is specified (ST15). The waiting position deciding circuit 27 determines whether or not the information recording layer in which the optical spot is currently formed is the first information recording layer 3 and whether or not the unrecorded region M exists in the first information recording layer 3 (ST16). If it is determined that the unrecorded region M exists in the first information recording layer 3, the optical head performs the jump operation from the boundary region between the unrecorded region M and the recordable region K, which corresponds to the recorded address, to the track on the side of the recorded region by a predetermined number of tracks, e.g., two tracks or more. Hereinafter this operation is referred to as retracting operation. If the unrecorded region M is absent and the recordable region K is present, the optical head accesses the position before the recordable region (ST17).

The jump is finished, it is confirmed that the optical head reaches the predetermined address before two tracks from the recording end track, and then the optical spot is held to become the waiting state in a manner that performs the jump by one track in every revolution of the optical disk D (ST18).

It is preferable that the predetermined track is decided such that the track positioning error signal detected by the push-pull method or the DPP method is not affected by the boundary region between the recorded region and the unrecorded region, and the proper value is shortly the two tracks. As shown in FIG. 2, the jumping operation for holding the track is started at the address position of the inner radius by one track, which substantially corresponds to the recording end position. As described above, when the retracting operation of at least two tracks is performed, negative effect of a change in the servo signal level, which exists in the boundary region between the recorded region R and the unrecorded region M, can be avoided, and the stably waiting operation can be realized.

Further, when a request in which the recording is performed at the position where the recording operation is finished without losing the region is given to the system controller 25, the information, which is necessary for the information recording and has been already recorded in the region before the recording start region, can be smoothly reproduced. Thereby, the recording operation can be rapidly performed without generating excessive operation before the information recording operation is started.

In the case after the recording operation has been performed into the unrecorded region M, since the recording end position becomes the boundary track, the access operation of the stop operation in step ST17 is realized in a manner that returns to the track before a first predetermined number of tracks by performing the jump (ST18).

In step ST16, when it is determined that the information recording layer in which the optical spot is currently formed is the first information recording layer 3, the unrecorded region M does not exist in the first information recording layer, and the unrecorded region M exists in the second information recording layer 4 (ST16), the layer jump is performed. That is, the access operation to the address in the predetermined second information recording layer decided by the waiting position deciding circuit 27 is performed as described below. The recording information management portion 26 detects an approximate address of the current information recording layer corresponding to the boundary region between the unrecorded region in the second information recording layer and the recorded region (ST19). At this point, in order to avoid the effect of eccentricity or the axial shift in bonding the two information recording layers, the approximate address is given as the address located on the inner radius side by about 0.1 mm (corresponding to a point B' in FIG. 6) to the address corresponding to the boundary region (corresponding to a point A in FIG. 6). The access operation (ST20) is performed to the address in the first information recording layer, and the layer jump is performed to the predetermined address (point B) in the second information recording layer after reaching the target address (ST21). Thereafter, focus drawing operation, various kinds of servo operation, and track drawing operation are performed (ST22), and then the reached address in the second information recording layer is read (ST23). The access operation is performed from the track which becomes the boundary of the unrecorded region M in the second information recording layer 4 to the track before a predetermined number of tracks. Otherwise the access operation is performed to the position before the recordable region K (ST24). Then, the track drawing operation is performed (ST25), the access is finished by the track holding operation, and the optical head enters the waiting state as shown in FIG. 6 (ST26).

In the above-described layer jump operation, if it is determined that the information recording layer in which the optical spot is currently formed is the second information recording layer 4 and the unrecorded region M exists in the first information recording layer 3 (ST16), when the access is performed to the boundary region of the first information recorded region, the layer jump operation is also performed in the same way and the optical head enters a waiting state as shown in FIG. 7.

On the other hand, as shown in FIG. 9, if it is determined that the unrecorded region M does not exist in both the first information recording layer 3 and the second information recording layer 4 (ST14), the waiting position deciding circuit 27 compares the recordable capacities of the two information recording layers, selects the information recording layer decided as having the larger capacity as the layer in the waiting state, and accesses other layers or the boundary region of the recordable region K having the largest capacity in the current layer. In FIG. 9, the optical head is moved to the recordable region K in the second information recording layer 4.

The rotational control of the spindle motor in the access to the waiting position shown in the step ST17 or the step ST24 will be described here referring to FIG. 17. When the access to the track located at the position before the predetermined amount of tracks which is specified as the waiting position is started (ST51), the waiting position deciding circuit 27 decides whether or not the zone to which the position before the predetermined amount of tracks which is specified as the waiting position belongs is different from the zone to which the boundary region between the recorded region R and the unrecorded region M corresponding to the address where the recording is completed in the step ST17, or decides whether or not the zone to which the position before the predetermined amount of tracks which is specified as the waiting position belongs is different from the zone to which the track located at the position before the track which is the boundary of the unrecorded region M of the second information recording layer by the predetermined amount of tracks belongs in the step ST24 (ST52).

If the zone to which the track specified as the waiting position belongs is the same as the zone to which the track before the first or second predetermined amount of tracks belongs, the access control such as the track jump is executed without changing the number of revolution of the spindle motor (ST53), and the movement to the waiting position is finished (ST54).

Figure 18:
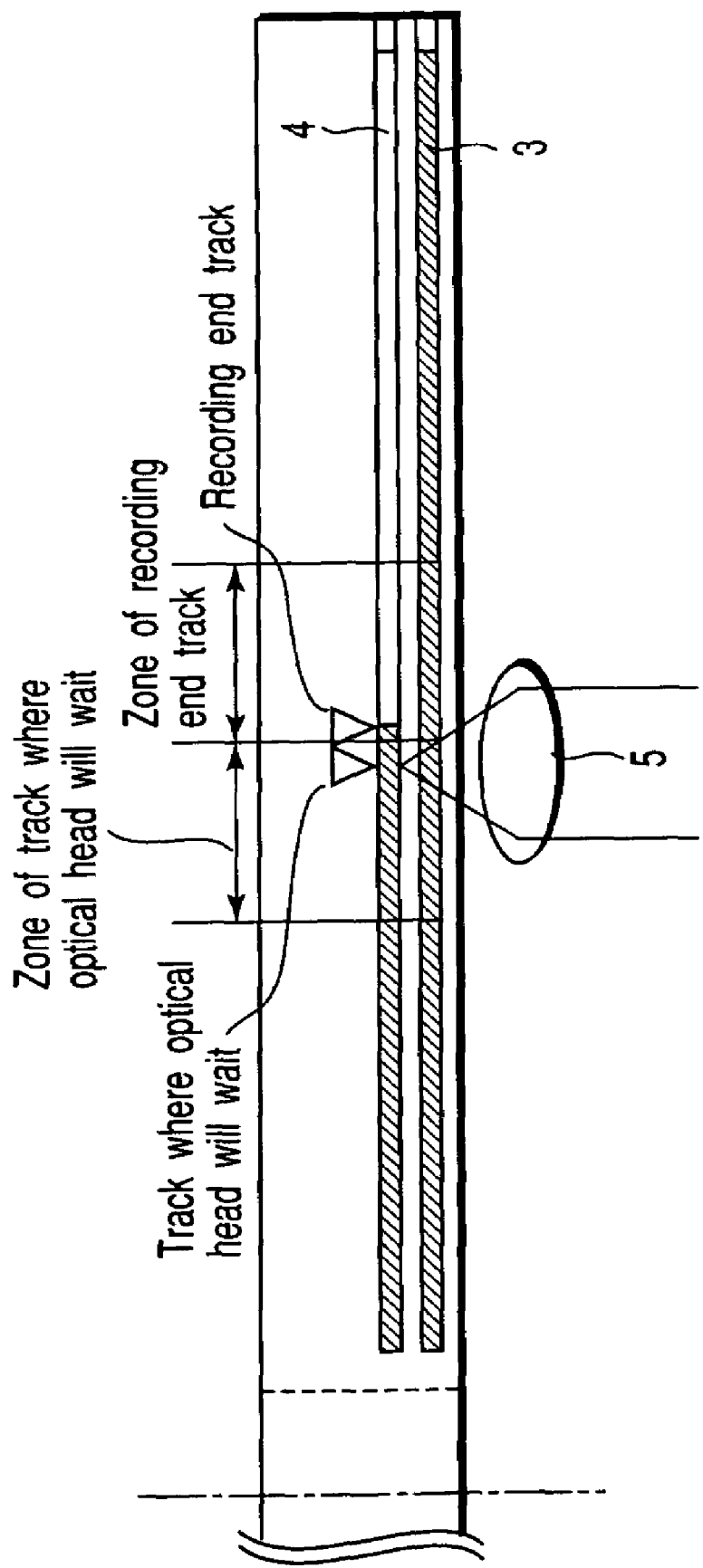
FIG. 18 is an explanatory diagram showing a case in which a waiting position and a boundary track belong to different zones, respectively.

If the zone to which the track specified as the waiting position belongs is different from the zone to which the track before the first or second predetermined amount of tracks belongs in step S52, however, it is examined whether the tracking does not result in the unstable state in such a manner that the optical head waits at the position of the innermost track of the zone to which the boundary region belongs (ST55). In other words, it is decided whether the tracking becomes stable or not by setting the innermost track of the zone to which the boundary region belongs as the waiting position, and it is decided by the amount of moving tracks whether the tracking becomes stable or not even if the predetermined amount of tracks is reduced. As shown in FIG. 18, the above-described situation occurs when the zone of the track where the optical head will wait is different from the zone of the recording end track. As a result of the decision, even in the case of the movement to the innermost track in the same zone, when it is decided that the amount of moving tracks is sufficient for the waiting, the access to the innermost track in the same zone is executed without changing the number of revolutions of the spindle motor (ST56). On the other hand, when it is decided that the access to the innermost track in the same zone is not sufficient for the number of returning tracks for performing the stable tracking, the access to the track located at the position before the predetermined amount of tracks, where the optical head will wait, is executed. At this point, usually the number of revolutions is controlled according to the zone, so that the control is performed at the number of revolutions which is specified in the zone which the optical head has reached. When the number of revolutions is changed, however, the number of revolutions must be changed again in the case that the optical head returns to the boundary region again. Therefore, while the number of revolutions of the spindle motor is held at the number of revolutions of the boundary region, the access to the track located at the position before the predetermined amount of tracks is executed (ST57), and the movement to the waiting position is completed (ST54).

The waiting method of the optical head according to the invention is performed by the above-described procedure. When the recording processing or the reproducing processing is finished, the optical head waits before the unrecorded region M or the recordable region K, which results in the secure and stable recording processing.

(In Starting the Optical Disk)

As shown in FIG. 11, the sequence of the waiting method according to the first embodiment of the invention can be also performed in starting the optical disk, i.e., after the optical disk D is inserted and recognized (ST10). In step ST27, when the optical head can not be moved, the waiting is performed at the initial position of the optical disk. As shown in FIGS. 5 and 8, even when the optical disk D has only the first information recording layer 3, obeying the procedure of the flow chart shown in FIGS. 10 and 11, the optical head can wait at the position shown in FIGS. 5 and 8.

(Power Saving Mode)

For a power saving mode, when the waiting state is maintained for a predetermined period of time or more and the system controller 25 does not receive the recording or reproducing request, the apparatus is changed to the state in which the optical spot is further moved to the recorded region side by a second predetermined number of tracks, each servo state is made to a holding state or an open-loop state, and only the focus servo is operating. The second predetermined number of tracks should be decided such that the optical spot is not formed in the boundary region by the effect of the eccentricity of the optical disk even if the track positioning servo becomes an open loop and the servo can be not controlled. When the amount of eccentricity is measured by the method such as learning, the second predetermined number of tracks is decided by the value of the amount of eccentricity. When the amount of eccentricity can not be measured, for example it is preferable that the value becomes about 0.1 mm.

Unless the retracting operation of the second predetermined number of tracks is not performed, the servo is possibly controlled into the unrecorded region, when the power saving state is released to enter the servo state again. As described above, the unrecorded region M and the recorded region R are different in the reflectivity of the information recording layer, it can be expected that the signal levels for servo are largely different. As a result, the servo state possibly becomes unstable, and a countermeasure is required, in order to stably and rapidly return from the power saving state. For the countermeasure, the second predetermined number of tracks is set in the above-described way to enter the power saving state, so that the apparatus can momentarily enter the stable servo state even if the information recording or reproducing request comes to the system controller which is in the waiting state.

Even if the retracting operation of the second predetermined amount of tracks is performed, like the control method shown in FIG. 17, the retracting operation is performed without changing the number of revolution of the spindle motor, so that the change in the number of revolution of the spindle motor which takes a great deal of time can be omitted and recovery time from the power saving mode can be shortened.

The first predetermined number of tracks, which is the avoidance from the unrecorded region M for the first time, can be set to a relatively larger value from start so as to be the same number as the second predetermined number of tracks.

(Other)

Since the information unrecorded region is absent in the recordable region K, the signal for the servo is not adversely affected by the boundary between the unrecorded region and the recorded region. However, in order to smoothly read the necessary information for the next recording operation such as the error correcting code when the request of the recording operation comes, it is desirable to perform the retracting operation returning from the track, where the final recording is finished, by the first predetermined number of tracks. In this case, since the servo state can return stably without performing the further retracting operation by the second predetermined number of tracks assuming the power saving state, it is not concerned that the retracting operation of the second predetermined number of tracks is not performed.

When the remaining capacity of the recordable region becomes a predetermined value, e.g., not more than 32 KB corresponding to 1 ECC block, the waiting position deciding circuit 27 determines that the recording operation can not be performed, and the optical head may always return to the first information recording layer in order to prepare the reproducing operation.

The unrecorded region M does not include a region where the recording is not intentionally performed due to the effect of a defect or the like and a region where having storage capacity lower than a predetermined capacity. When the unrecorded region M is filled with virtual data by the request for filling the region with the virtual data, the virtual data recorded region can be treated as the unrecorded region M or the recordable region K.

When the optical head enters the waiting state by receiving the end of the information reproducing operation, in the case where the end is generated by the pause command and the like, the track holding operation can be performed for the track in the end without the access to the boundary region.

When the optical head enters the waiting state by receiving the end of the information reproducing operation, considering the possibility of resuming the reproducing operation, the optical head waits at the current position until the expiration of a predetermined period of time. Assuming that there is no possibility of resuming the reproducing operation after the predetermined period of time, it is also possible to newly set the operation mode in which the optical head is moved to the unrecorded region M or the recordable region K. By providing such operation mode, it is possible to improve operability of the reproducing processing of the recorded optical disk.

As described above, the first embodiment of the invention is to provide the optical disk apparatus and the waiting method thereof, in which the optical head can wait with the stable servo state in such a manner that the optical head waits before the unrecorded region M or the recordable region K, and the recording processing can be rapidly resumed.

The waiting method of the invention includes at least the waiting method after the recording is continuously performed in the unrecorded region, the waiting method after the recording operation in the case where the unrecorded region exists in both the two information recording layers, the waiting method after the recording is performed in the information recording layer in which the information recording has been performed at least once, and the waiting method after the reproducing operation of the information.

Although the case where the optical disk has the information recording layer of one or two layers on one side has been described in the above-described first embodiment, it is possible to expect the waiting method having the same effect and advantage even when the optical disk has three or more information recording layers.

Further, even if the pause command is forcedly given to the system controller during the recording or reproducing of the information, by performing the retracting operation in the waiting method, the operation can be performed stably and rapidly after the pause command is released.

Second Embodiment

In the optical disk apparatus specified in the first embodiment of the invention, a second embodiment is to provide the optical disk apparatus and the waiting method thereof, in which the waiting position of the optical head with respect to the unrecorded region or the recordable region is set on the inner radius side of the unrecorded region or the recordable region when the optical disk has a track structure in which the recording is performed from the inner radius side to the outer radius side, and the waiting position is set on the outer radius side of the unrecorded region or the recordable region when the optical disk has a truck structure in which the recording is performed from the outer radius side to the inner radius side. FIG. 12 shows an example of the waiting position of the optical head in the optical disk apparatus according to the second embodiment of the invention.

The optical disk D shown in FIG. 12 has two information recording layers on one side, the track structure has a groove structure, the first information recording layer 3 has the track structure so as to perform the recording from the inner radius to the outer radius, and the second information recording layer 4 has the track structure so as to perform the recording from the outer radius to the inner radius.

In the optical disk apparatus performing the recording and reproducing to the optical disk having such disk structure, since the structure is the same as that of the first embodiment, the description is omitted. The waiting method in the optical disk apparatus is also the same as the sequence of the waiting method of the first embodiment, which is shown in FIGS. 10 and 11.

With reference to the different point from the first embodiment, since the track structure of the second information recording layer 4 is a structure in which the recording can be performed from the outer radius to the inner radius, in the track jumping method in the track-holding to the target track to wait, the optical head jumps from a predetermined jump starting position toward the outer radius and waits at the position in the outer radius direction. At this point, in order to avoid the eccentricity or the axial shift in bonding the two information recording layers, the approximate address is given as the address located on the inner radius side by about 0.1 mm (corresponding to a point B' in FIG. 12) to the address corresponding to the boundary region (corresponding to a point A in FIG. 12), and the access operation, as shown in step ST20, is performed to the address within the first information recording layer 3.

After reaching the target address, similarly to the first embodiment, the layer jump to the predetermined address (point B in FIG. 12) in the second information recording layer 4 is performed as shown in step ST21. As shown in FIG. 12, in the second embodiment, when the unrecorded region M exists in the second information recording layer 4, obeying the decision procedure shown in FIG. 10, the optical spot waits at the position away by, e.g., two tracks or more in the outer radius direction of the unrecorded region M.

In this case, the rotational control method for the spindle motor is performed by converting to not the access to the innermost track of the zone but the access to the outermost track according to the structure of the recording track in the steps ST55 and ST56 shown in FIG. 17.

As described above, in the second embodiment, it is specified that the direction of the track jump and the waiting position of the optical head are decided corresponding to the recording direction in the optical disk D.

Third Embodiment

Figure 13:
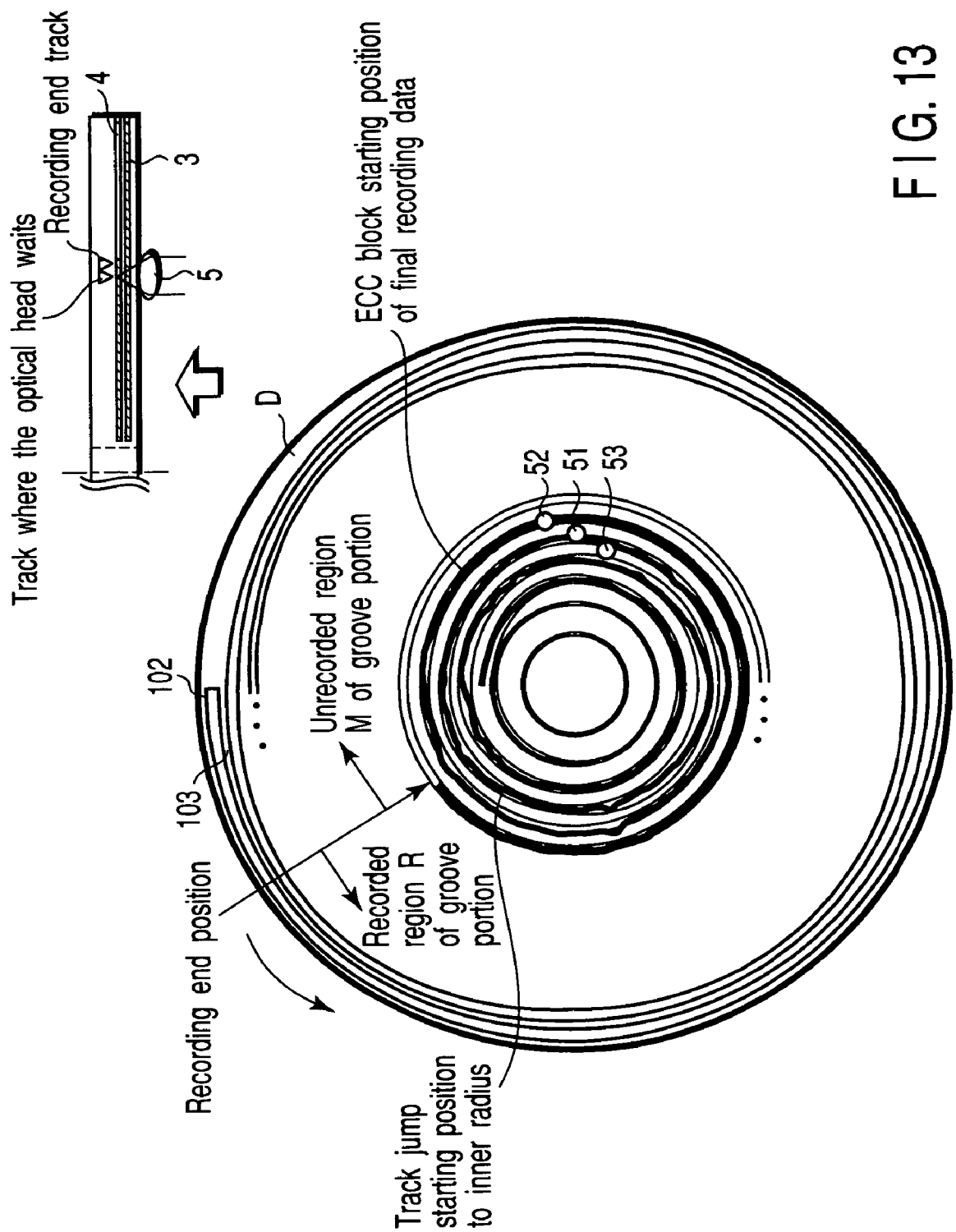
FIG. 13 shows an example of a waiting position of an optical head in an optical disk apparatus according to a third embodiment of the invention.
Figure 15:
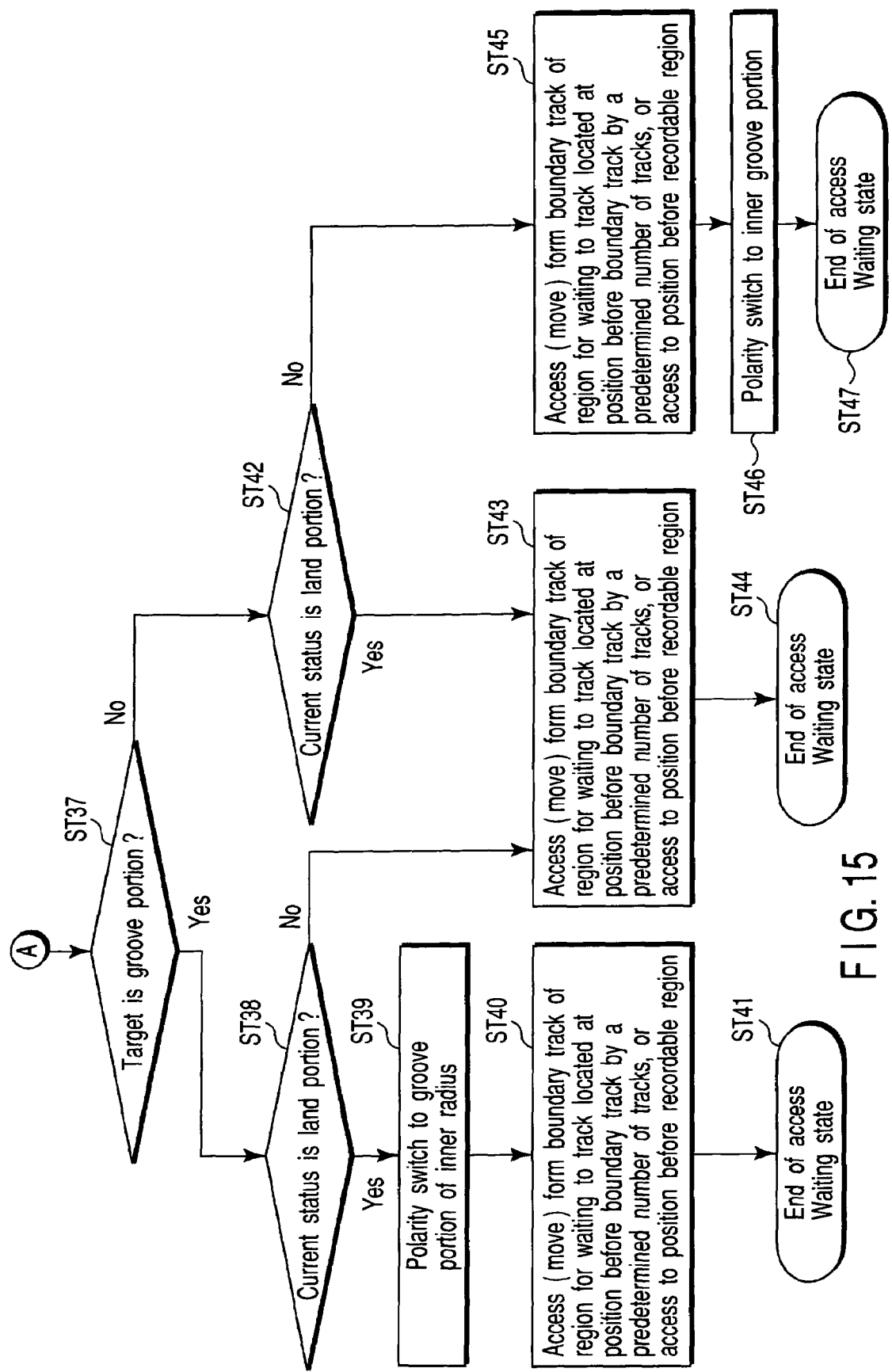
FIG. 15 is a flow chart for explaining an example of the waiting method according to the third embodiment of the invention.
Figure 16:
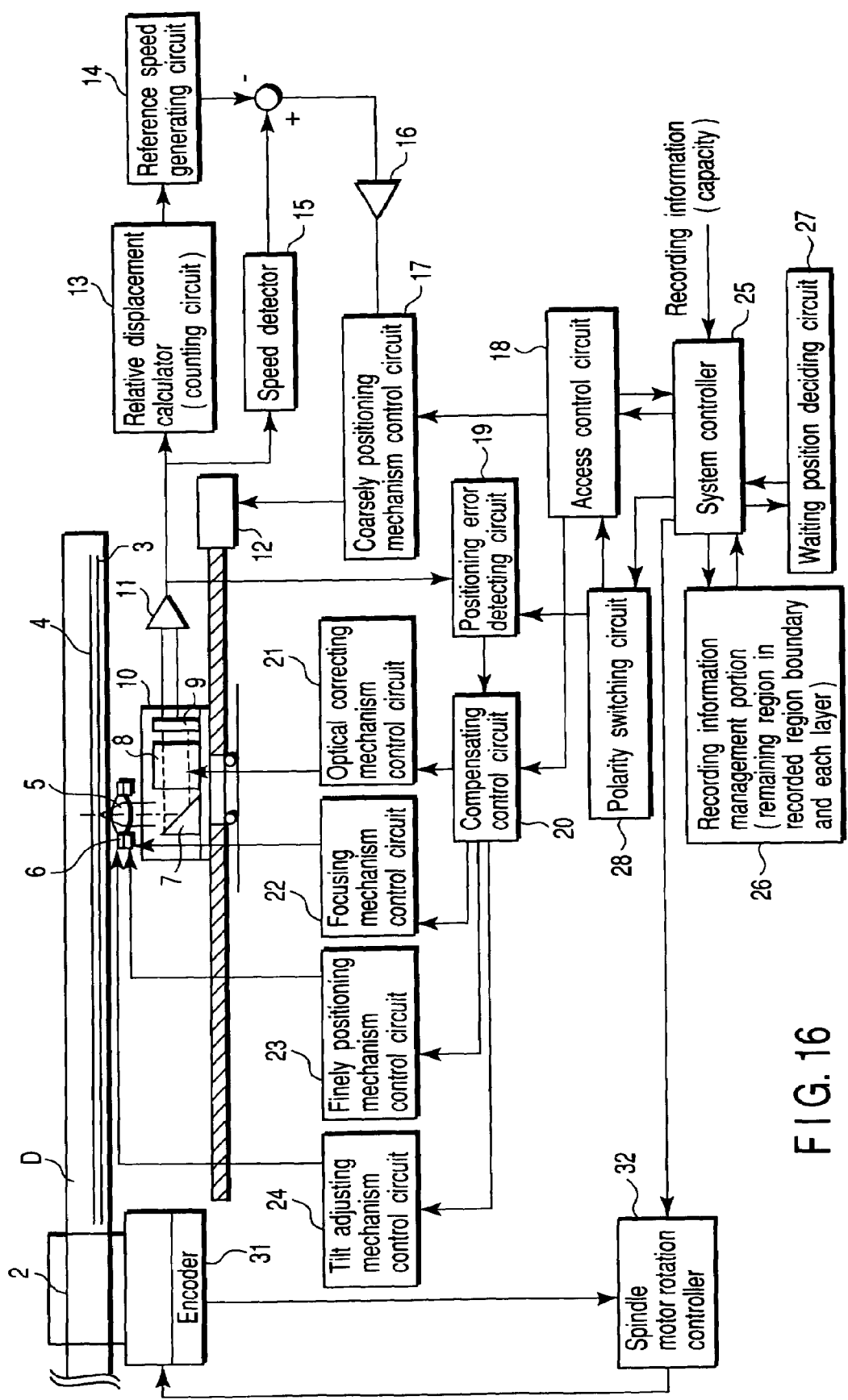
FIG. 16 is a block diagram showing an example of the optical disk apparatus according to the third embodiment of the invention.

In the optical disk apparatus specified in the first embodiment of the invention, a third embodiment is to provide the optical disk apparatus and the waiting method thereof, in which a region that should have the priority for the waiting position when the plural unrecorded regions exist is specified in the case of a track structure having the recorded region in a groove and a land. FIG. 13 shows an example showing the waiting position of the optical head in the optical disk apparatus according to the third embodiment of the invention, FIGS. 14 and 15 are flow charts for explaining an example of the waiting method according to the third embodiment, and FIG. 16 is a block diagram showing an example of the optical disk apparatus according to the third embodiment.

The optical disk D for the third embodiment is shown in FIG. 12, and the optical disk has a truck structure having the recorded region in both the groove and the land. Further, as shown in FIG. 16, the optical disk apparatus according to the third embodiment has substantially the same structure as that according to the first embodiment of FIG. 1. However, the optical disk apparatus of the third embodiment differs from the apparatus of the first embodiment in that the apparatus of the third embodiment further has a polarity switching circuit 28 for switching between the groove and the land, and the control signal is supplied to the compensating controller 20 and the positioning error detecting circuit 19 to switch the polarity under the control of the system controller 25.

As shown in FIG. 13, in the optical disk apparatus according to the third embodiment, usually the recording is performed in a groove portion 102 at first and then the recording is performed in a land portion 103. In this case, the sequence of the waiting method is the flow charts shown in FIGS. 14 and 15.

The waiting method of the third embodiment will be described in detail below referring to the flow charts shown in FIGS. 14 and 15. It can be considered that the groove portion and the land portion in the track structure of the optical disk are different two information recorded regions. In the sequences of FIGS. 14 and 15, after the recording or reproducing of the information is performed, when the system controller 25 determines that the information recording or reproducing operation is finished (ST31), the recording information management portion 26 calculates the capacities of the recordable region K and the unrecorded region M of the information recording layer, in which the optical spots are currently formed, for the land portion and the groove portion, respectively (ST32). At the same time, the recording information management portion 26 also calculates the capacities of the recordable region K and the unrecorded region M of the information recording layer, in which the optical spots are not currently formed, for the land portion and the groove portion, respectively (ST33).

According to the detected result, the waiting position deciding circuit 27 determines whether or not the optical disk can be moved to the unrecorded region M or the recordable region K (ST34), if there is the object to which the optical head can be moved, the moving address is specified (ST35). When the plural unrecorded regions M are present, the above-described waiting position can be used as the priority. When the unrecorded regions M exist in the land portion and the groove portion, respectively, for example, it is possible that the land portion has the priority, and it is also possible that the groove portion has the priority.

Further, the optical disk waits at the current position in the case where the unrecorded region M or the recordable region K, to which the optical head can be moved, does not exist, and the optical head waits at the initial position in the case of starting the optical disk (ST53).

The waiting position deciding circuit 27 determines whether or not the information recording layer in which the optical spot is currently formed is the first information recording layer 3, and determines whether or not the moving object exists in the first information recording layer (ST36). When it is determined that the waiting position is the current layer, the waiting position deciding circuit 27 determines whether it is the groove portion or the land portion (ST37). At this point, when it is determined that the unrecorded region M exists in the groove portion, the jump operation is performed from the boundary region between the unrecorded region M and the recordable region K in the groove portion, in which the recording should be preferentially performed, to the track located by the first predetermined number of tracks on the recorded region side. In the jump operation, since sometimes the unrecorded region also exists in the land portion, when the target track in which the optical spot is currently formed is the land track (ST38), the optical head jumps to the groove track on the inner radius side with the polarity switching circuit 28 to switch the polarity of the track positioning so as to position in the groove track (ST39). Then, the jump operation is started from the boundary track in the region for the waiting to the position, e.g., before the second track or more. Alternatively, the optical head accesses the position before the recordable region K (ST40). Thereafter, the access is finished to become the waiting state (ST41). If the current status is not the groove in step ST42, the jump operation is started from the boundary track in the region for the waiting to the position, e.g., before the second track or more. Alternatively, the optical head accesses the position before the recordable region K (ST43).

On the other hand, when the unrecorded region M does not exist in the groove portion and the unrecorded region M exists only in the land portion in step ST42, the jump operation is performed from the boundary region between the unrecorded region M and the recordable region K in the land portion to the track located by the first predetermined number of tracks on the recorded region side (ST43), and the optical head enters the waiting state (ST44). In the jump operation, since the unrecorded region M does not exist in the groove region, it is not necessary to switch the polarity for the track positioning prior to the jump operation. However, when the track positioning is performed in the groove track in the starting the jump, after the optical head reaches the groove track before the position by the first predetermined number of tracks, which in converted into the groove track (ST45), the jump is performed with the polarity switching circuit 28 to the land track on the recorded region side (ST46), and the positioning to the land track is achieved (ST47).

The jump is finished, the system controller confirms that the optical head reaches the predetermined address before the recording end track by the first predetermined number of tracks. Then, the optical spot enters the waiting state in such a manner that the optical spot is held by performing the jump by one track in every revolution of the optical disk. At this point, in the predetermined track, it is preferable that the predetermined track is decided so that the track positioning error signal detected by the push-pull method or the DPP method is not affected by the boundary region between the recorded region R and the unrecorded region M, and the proper value is shortly the two tracks. As shown in FIG. 13, the jumping operation for holding the track is started is started at the address position of the inner radius by one track, which substantially corresponds to the recording end position.

As described above, when at least the two tracks of the retracting operation is performed, negative effect of a change in the servo signal level, which exists in the boundary region between the recorded region and the unrecorded region, can be avoided, and the stably waiting operation can be realized. When a request in which the recording is performed at the position where the recording operation is finished without losing the region is given to the system controller 25, the information, which is necessary for the information recording and has been already recorded in the region before the recording start region, can be smoothly reproduced and the recording operation can be rapidly performed without generating excessive operation before the information recording operation is started.

On the other hand, in step ST36, when the waiting position deciding circuit 27 decides the movement from the current information recording layer to the different layer in the selection of the information recording layer where the optical head waits, in the same way as the first embodiment, the layer jump which is specified by the steps ST48 to ST52 is performed, and the track positioning is temporarily performed in the retractable track to obtain the address (ST52). Then, the optical head can enter the waiting state by the same procedures as those of the steps ST37 to ST47.

Sometimes the information recording layer of the optical disk D is divided into predetermined zones. In this case, after performing the recording in one of the groove portion and the land portion in the divided zone, the recording in the other is started. Although, in the third embodiment, it is described that the recording is started from the groove portion, the recording may be started from the land portion.

Similarly to the first embodiment, the rotational control operation for the spindle motor in the steps ST40, ST43, and ST45 is decided and performed by the steps shown in FIG. 17.

As described above, the third embodiment can provide the optical disk apparatus and the waiting method thereof, the remaining unrecorded region M can be used for the recording to rapidly perform the recording with high reliability by moving the optical head to the unrecorded region M or the recordable region K in the same way as the first embodiment, even when the recorded region of the optical disk is divided into the land portion and the groove portion.

However, those skilled in the art can be realized by the various embodiments described above, those skilled in the art could easily make the various modifications of the embodiments, and apply the embodiments to various applications without any inventive ability. Accordingly, the invention covers a wide range which is not contradictory to disclosed principles and novel features, and is not limited to the above-described embodiments.

As described in detail above, according to the invention, the stable servo operation can be realized without receiving the effect of the boundary region between the unrecorded region and the recordable region, the remaining unrecorded region M can be used for the recording, and, when the recording request is given, the necessary information can be reproduced in a manner that uses the information which has been recorded by directly performing track trace, so that the optical disk apparatus and the waiting method thereof, which can rapidly start the recording operation, can be provided.

What is claimed is:

1. An optical disk apparatus comprising:
   an optical head which applies or receives a laser beam to or from an optical disk including an information recording layer, to perform recording or reproducing processing;
   a waiting position determination unit which detects a wave reflected from the optical disk using the optical head, discriminates an unrecorded region from a recorded region based on a height of reflectivity or reflectivity distribution of the optical disk corresponding to the detected wave, and determines, as a waiting position, a position in the recorded region two or more tracks away from a boundary between the unrecorded region and the recorded region, after the recording or the reproducing processing is finished; and
   a control unit which moves the optical head to the waiting position, shifts the waiting position by a preset amount away from the boundary and moves the optical head to the shifted waiting position, when there is no instruction to perform recording processing or reproduction processing even after a preset time elapses, and performs control for shifting the optical disk apparatus to a power-saving state in which various servo states other then focus servo are made to holding states or open states, and only the focus servo is kept to be performed.

2. The optical disk apparatus according to claim 1, wherein the preset amount set by the control unit is about 0.1 mm.

3. A method of retracting an optical head incorporated in an optical disk apparatus in which the optical head applies or receives a laser beam to or from an optical disk including an information recording layer, to perform recording or reproducing processing, comprising:
   detecting a wave reflected from the optical disk using the optical head, discriminating an unrecorded region from a recorded region based on a height of reflectivity or reflectivity distribution of the optical disk corresponding to the detected wave, and determining, as a waiting position, a position in the recorded region two or more tracks away from a boundary between the unrecorded region and the recorded region, after finishing the recording or the reproducing processing; and
   moving the optical head to the waiting position, shifting the waiting position by a preset amount away from the boundary and moving the optical head to the shifted waiting position, when there is no instruction to perform recording processing or reproduction processing even after a preset time elapses, and performing control for shifting the optical disk apparatus to a power-saving state in which various servo states other then focus servo are made to holding states or open states, and only the focus servo is kept to be performed.

4. The method according to claim 3, wherein the preset amount set by the control unit is about 0.1 mm.

* * * * *